US012576772B2

(12) United States Patent
Thompson

(10) Patent No.: US 12,576,772 B2
(45) Date of Patent: Mar. 17, 2026

(54) RETRACTABLE AWNING FOR COVERING RV SLIDE-OUT ROOM

(71) Applicant: Airxcel, Inc., Wichita, KS (US)

(72) Inventor: Scott Thompson, Aspen, CO (US)

(73) Assignee: Airxcel, Inc., Wichita, KS (US)

( * ) Notice: Subject to any disclaimer, the term of this patent is extended or adjusted under 35 U.S.C. 154(b) by 236 days.

(21) Appl. No.: 18/500,717

(22) Filed: Nov. 2, 2023

(65) Prior Publication Data

US 2024/0190329 A1 Jun. 13, 2024

Related U.S. Application Data

(60) Provisional application No. 63/430,888, filed on Dec. 7, 2022.

(51) Int. Cl.
*E04F 10/06* (2006.01)
*B60P 3/34* (2006.01)

(52) U.S. Cl.
CPC .......... *B60P 3/343* (2013.01); *E04F 10/0648* (2013.01)

(58) Field of Classification Search
CPC ............... E04F 10/0625; E04F 10/0611; E04F 10/0662; E04F 10/0648; E04F 10/06; B60J 3/002; B60J 3/343; F16B 2/04; F16B 2200/30; F16B 7/025
See application file for complete search history.

(56) References Cited

U.S. PATENT DOCUMENTS

| | | | | |
|---|---|---|---|---|
| 3,918,511 A | * | 11/1975 | Upton, Jr. ........... | E04F 10/0625 160/67 |
| 4,342,524 A | * | 8/1982 | Anderson ................. | F16B 3/00 403/381 |
| 4,520,701 A | * | 6/1985 | Watamura ............. | B23B 29/244 82/158 |
| 6,276,882 B1 | * | 8/2001 | Young ................... | F16B 13/124 411/60.2 |
| 6,554,235 B1 | * | 4/2003 | Fortier ................... | A47B 91/02 248/200.1 |
| 6,712,540 B2 | * | 3/2004 | Schmalzhofer ......... | F16B 7/187 403/374.1 |
| 7,188,889 B2 | * | 3/2007 | Wagner ................... | B60P 3/343 135/88.11 |
| 10,844,605 B2 | * | 11/2020 | Thompson .......... | E04F 10/0614 |
| 11,458,820 B2 | * | 10/2022 | Boessler ............ | E04F 10/0662 |
| 2005/0008431 A1 | * | 1/2005 | Albaugh ................... | F16B 2/04 403/368 |
| 2005/0042024 A1 | * | 2/2005 | Patrignani ............... | F16B 7/025 403/297 |
| 2006/0133893 A1 | * | 6/2006 | Harashima .......... | F15B 13/0839 403/331 |
| 2007/0181758 A1 | * | 8/2007 | Hall ....................... | G03B 21/58 248/222.11 |

* cited by examiner

*Primary Examiner* — Abe Massad
(74) *Attorney, Agent, or Firm* — Hovey Williams LLP

(57) ABSTRACT

A retractable awning is provided for a slide-out room on a recreational vehicle. The retractable awning includes a roller that has opposite ends supported by a head assembly. A slide bracket assembly is associated with each head assembly and includes a plate mounted on the slide-out room and a mounting arm that extends from the head assembly and may be slidably joined with the plate using a tenon and slot interconnection.

20 Claims, 5 Drawing Sheets

RETRACTABLE AWNING FOR COVERING RV SLIDE-OUT ROOM

RELATED APPLICATIONS

The present U.S. non-provisional patent application claims priority benefit of an earlier-filed U.S. provisional patent application of the same title, Ser. No. 63/430,888, filed Dec. 7, 2022, the content of which is hereby incorporated by reference into the present application.

BACKGROUND

The present disclosure relates generally to retractable awnings and, more particularly, to a retractable awning of the type for mounting to a side of a recreational vehicle to cover the top of a slide-out room on the recreational vehicle.

Retractable awnings, sometimes referred to as slide topper awnings, are used to cover the top of slide-out rooms on various types of recreational vehicles, such as motor homes, travel trailers, folding camping trailers, and truck campers. The retractable awnings help prevent water, leaves and other debris from collecting on the top of the slide-out room and damaging or evading the seals surrounding the slide-out opening in the side of the recreational vehicle.

The retractable awnings typically include a tubular roller that is supported at its opposite ends by a pair of two-piece slide brackets that are installed on the outward facing front side of the slide-out room. A canopy is normally attached at its back end to an awning rail that is mounted on the side of the recreational vehicle. A front end of the canopy is attached to and winds around the roller when the retractable awning is in the retracted storage configuration. The canopy unwinds from the roller as the slide-out room is moved to a deployed position spaced from the side of the recreational vehicle. A torsion spring within the roller maintains tension on the canopy and causes the roller to rotate in an opposite direction when the slide-out room is returned to its storage position.

The two-piece slide brackets that are frequently used to mount the roller to the front of the slide-out room are positioned to support head assemblies at opposite ends of the roller. Each of the slide brackets comprises a plate that is secured to the front side of the slide-out room and a receiver bracket that slides onto the plate. The receiver bracket includes a tubular member for slidably receiving an extension rod from the head assembly. The receiver brackets are laterally adjustable to facilitate insertion of the extension rods during initial mounting of the roller and canopy to the slide brackets. Once the roller is centrally positioned between the slide brackets, the extension rods are secured to the slide brackets by screws or other fasteners. The exposed extension rods and slide brackets present an unfinished and utilitarian appearance that may detract from visual appeal of the retractable awning.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, the disclosure is directed to a retractable awning for mounting with a slide-out room on a recreational vehicle. The retractable awning comprises: a roller having opposite ends that are each supported by a head assembly; a canopy having a back end for attachment with the recreational vehicle and a front end attached to the roller, the roller being rotatable in one direction to cause said canopy to wind around the roller and being rotatable in an opposite direction to allow said canopy to unwind from the roller; and a slide bracket assembly associated with each head assembly. Each said slide bracket assembly comprises: a plate for mounting on a front side of the slide-out room and an elongated tenon extended outwardly from a main body of the plate; and an elongated mounting arm that extends from the head assembly and includes an elongated slot that slidably receives the tenon from the plate and is lockable with the tenon to prevent sliding movement of the tenon within the slot.

In another aspect, the disclosure is directed to a retractable awning for mounting with a slide-out room on a recreational vehicle. The retractable awning comprises: a roller having opposite ends that are each supported by a head assembly; a canopy having a back end for attachment with the recreational vehicle and a front end attached to the roller, the roller being rotatable in one direction to cause said canopy to wind around the roller and being rotatable in an opposite direction to allow said canopy to unwind from the roller; a torsion spring carried on an internal rod within the roller that urges rotation of the roller to cause winding of the canopy on the roller; and a slide bracket assembly associated with each head assembly. Each said slide bracket assembly comprises: a plate for mounting on a front side of the slide-out room and an elongated tenon extended outwardly from a main body of the plate; and an elongated mounting arm that extends from the head assembly and includes an elongated slot that slidably receives the tenon from the plate and is lockable with the tenon to prevent sliding movement of the tenon within the slot.

BRIEF DESCRIPTION OF THE DRAWINGS

The present technology is described in detail below with reference to the attached drawing figures, in which like numerals represent the same components, and wherein.

DETAILED DESCRIPTION

Figure 1:
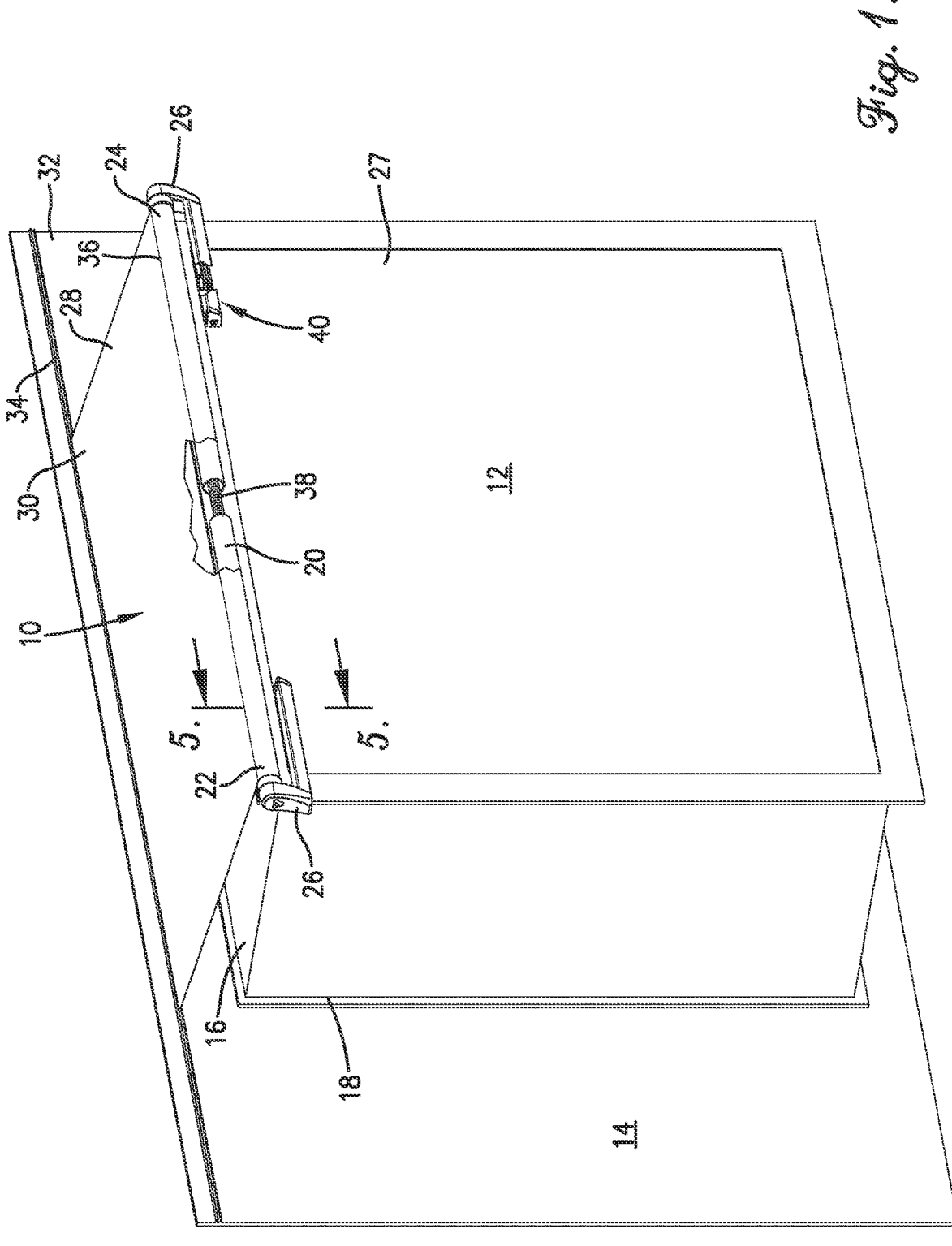
FIG. 1 is a front perspective view of a retractable awning having an adjustable pitch according to aspects of the disclosure and shown mounted on a slide-out room of a recreational vehicle.

Turning now to the drawings in greater detail and initially to FIG. 1, a retractable awning having an adjustable pitch is shown and is represented generally by the numeral 10. The retractable awning 10 is shown installed in covering relationship to a slide-out room 12 that is in a deployed configuration spaced from the side of a recreational vehicle 14. The retractable awning 10 functions to prevent water, leaves, and other debris from collecting on a horizontally extending top 16 of the slide-out room 12 and potentially damaging or evading seals 18 that surround a slide-out opening in the side of the recreational vehicle 14. The recreational vehicle 14 can be of various types, such as a motor home, travel trailer, folding camping trailer, or truck camper.

The retractable awning 10 comprises an elongated roller 20 that may of a tubular construction and has opposite ends 22 and 24 that are each supported for rotation by a head assembly 26. Each head assembly 26 is mounted to an outwardly facing front side 27 of the slide-out room 12 in a manner described below. The retractable awning 10 further includes a canopy 28 having a back end 30 that is attached to a side 32 of the recreational vehicle 14 from which the slide-out room 12 extends, such as by an awning rail 34, and a front end 36 that is attached to the roller 20. The canopy 28 may be made from vinyl or acrylic fabrics or other materials and is able to wind on the roller 20 when the roller 20 rotates in one direction and unwind from the roller 20 when the roller 20 rotates in an opposite direction during movement of the slide-out room 12 between the deployed configuration shown in FIG. 1 and a retracted storage configuration that is flush with the side of the recreational vehicle 14 (not shown). A torsion spring 28 may be carried on an internal rod (not shown) within the roller 20 and extends between the head assemblies 26 to exert a tensioning force on the canopy 28 and urge rotation of the roller 20 to cause winding of the canopy 28 on the roller 20.

Figure 2:
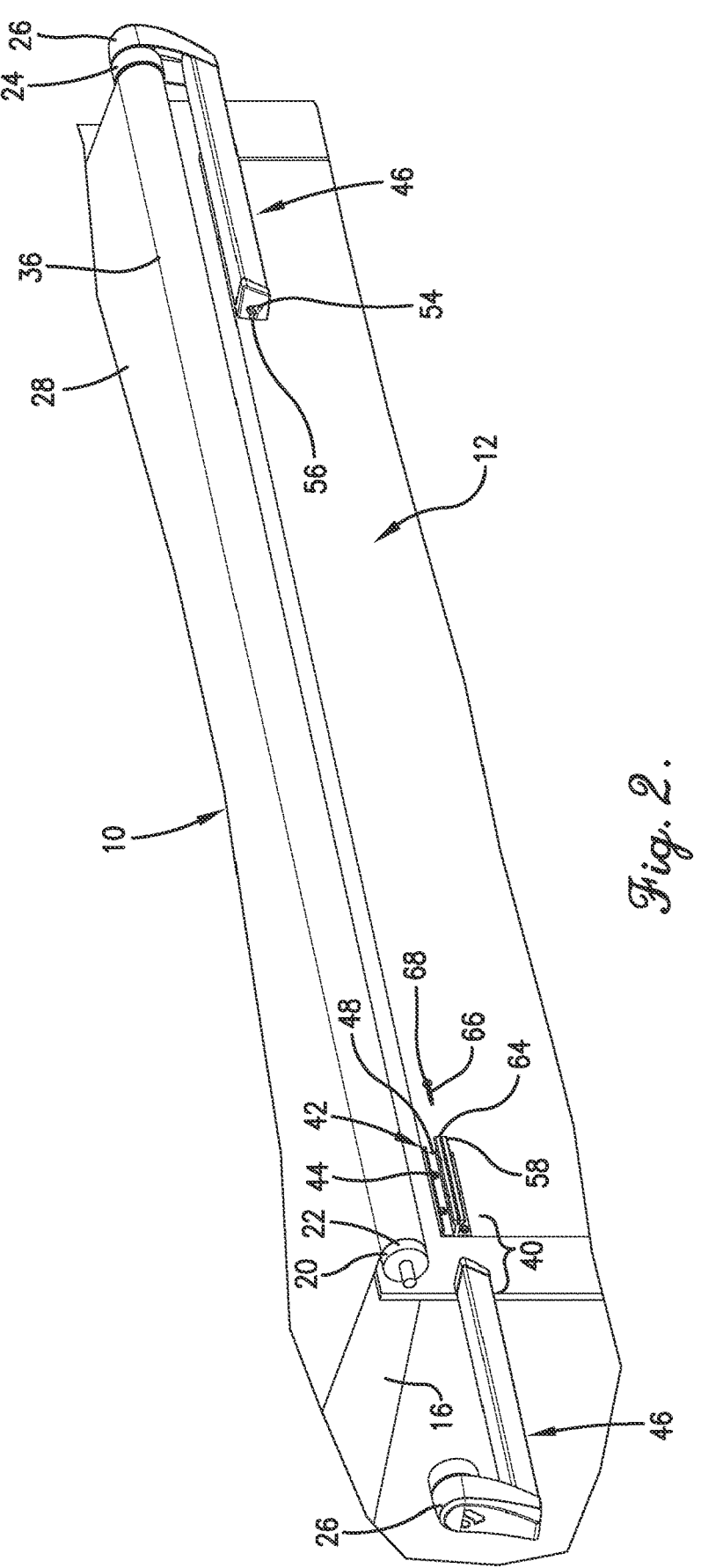
FIG. 2 is a front perspective and partially exploded view of the retractable awning.
Figure 3:
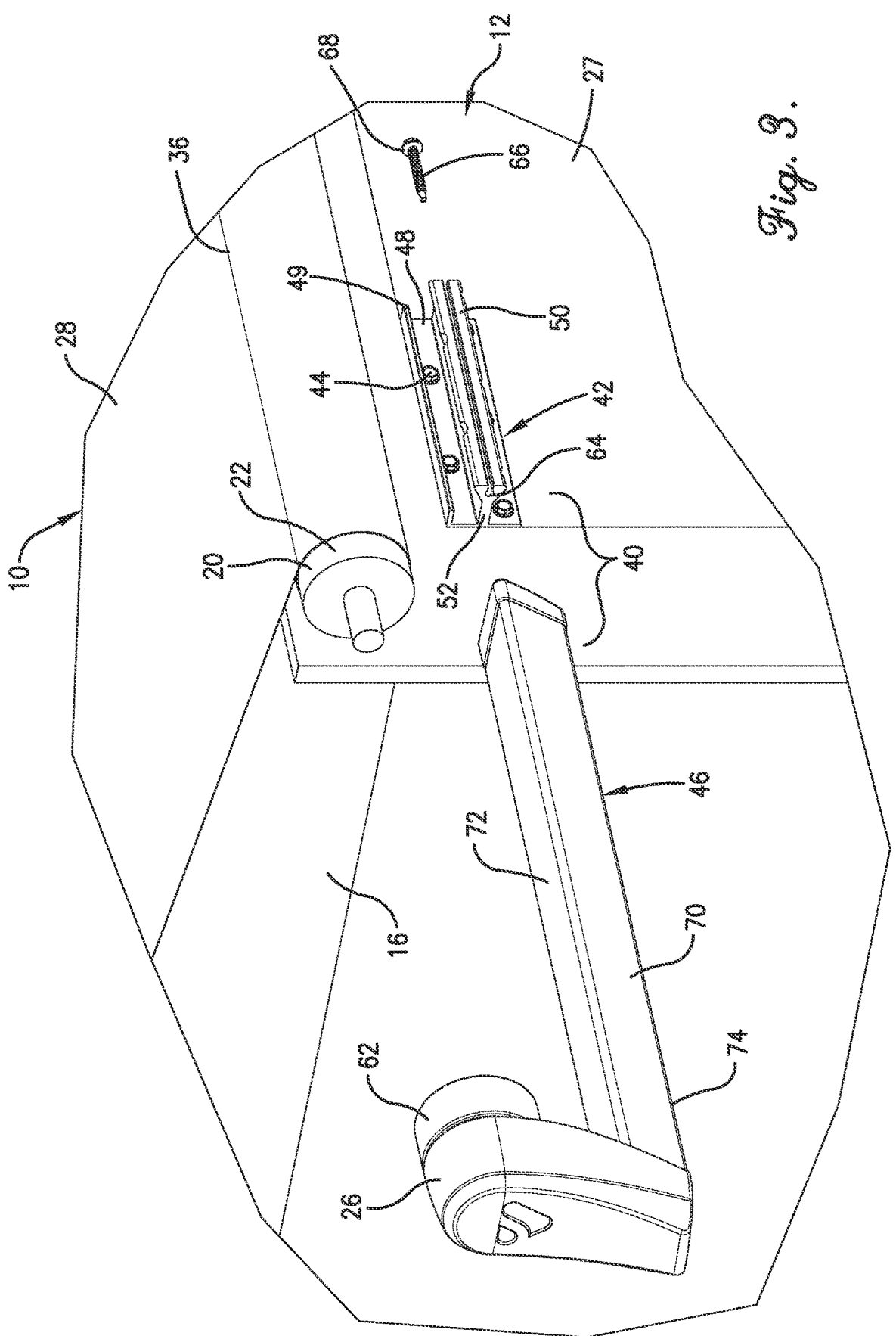
FIG. 3 is a fragmentary, front perspective and partially exploded view of the retractable awning and shown on an enlarged scale from FIG. 2.
Figure 4:
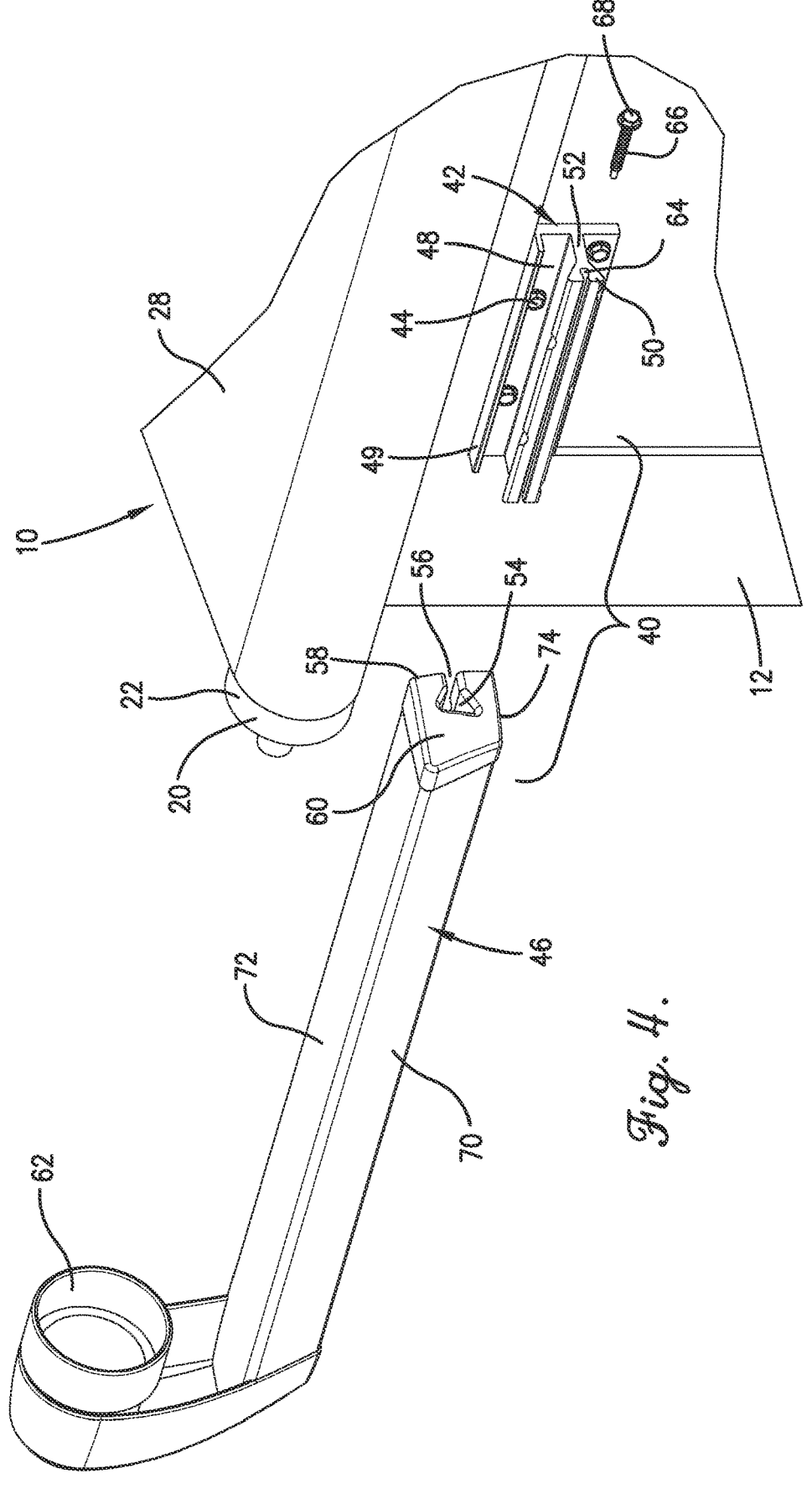
FIG. 4 is a fragmentary, front perspective and partially exploded view of the retractable awning and similar to the view shown in FIG. 3, but taken from a different perspective.

Turning now additionally to FIGS. 2-4, a slide bracket assembly 40 is used to mount each of the head assemblies 26 to the front side 27 of the slide-out room 12. The slide brackets assemblies 40 are positioned in proximity to the opposite ends 22 and 24 of the roller 20. Each slide bracket assembly 40 comprises a plate 42 that is attached by fasteners, such as screws 44, to the front side 27 of the slide-out room 12 and a mounting arm 46 that extends from the head assembly 26 and may be slidably joined to the plate 42 in a manner to cover the plate 42 and screws 44 to provide a finished and visually appealing appearance.

In one embodiment, each plate 42 includes a planar main body 48 through which the screws 44 extend to mount the plate 42 to an upper portion of the front side 27 of the slide-out room 12 with the planar main body 48 in a vertical orientation. The plate 42 may include an outwardly extending flange 49 along an upper edge of the plate 42 and a horizontally extending elongated tenon 50 that may be positioned at a location between the upper edge and a lower edge of the plate 42 and spaced outwardly from a front face of the plate 42 by a standoff 52. Each mounting arm 46 includes an elongated mortise or slot 54 that opens through a narrow neck opening 56 into a back side 58 of the mounting arm 46 that faces the plate 42. The slot 54 and neck opening 56 also extend through an end 60 of the mounting arm 46 that faces in a direction toward the opposite mounting arm 46 and away from an end cap 62 of the head assembly 26 that covers the associated end 22 or 24 of the roller 20.

The elongated tenon 50 and the slot 54, and the neck opening 56 and the standoff 52, are complementally sized, shaped and oriented to allow the mounting arm 46 to slide along the plate 42 with the tenon 50 of the plate 42 closely received within the slot 54 of the mounting arm 46 during initial insertion of the ends 22 and 24 of the roller 20 within the head assemblies 26 and centering of the roller 20 and the head assemblies 26 during installation of the retractable awning 10.

In one installation method, one of the head assemblies 26 may be slidably connected to the associated slide bracket assembly 40 by end-wise insertion of the tenon 50 of the plate 42 into the slot 54 of the mounting arm 46. The end 22 of the roller 20 may then be inserted into and supported by the end cap 62 of the head assembly 26 while the end cap 62 of the other head assembly 26 is placed on the opposite end 24 of the roller 20 and the associated mounting arm 46 is brought into sliding engagement with the associated slide bracket assembly 40. The head assemblies 26 and the supported roller 20 and canopy 28 may then be slidably moved as a unit in either lateral direction on the slide bracket assemblies 40 to reach the desired centered or other position on the front side 27 of the slide-out room 12.

Figure 6:
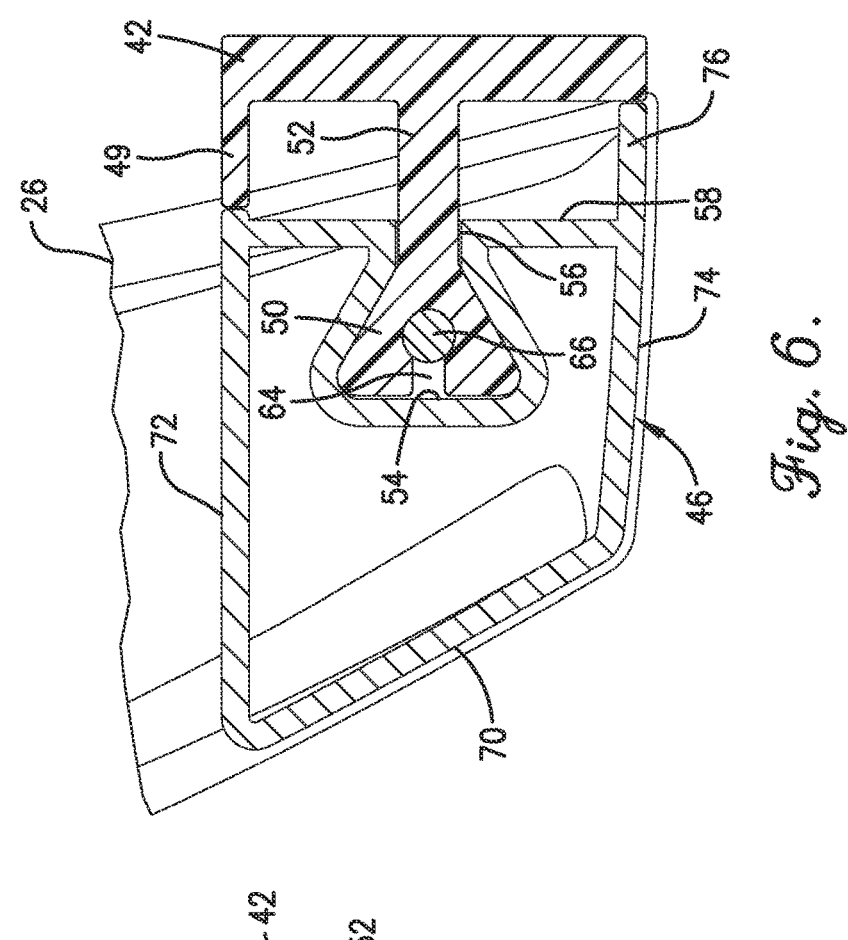
FIG. 6 is an end elevation view of the retractable awning taken in vertical section like the view shown in FIG. 5, but with a slide bracket assembly shown in a locked configuration.
Figure 5:
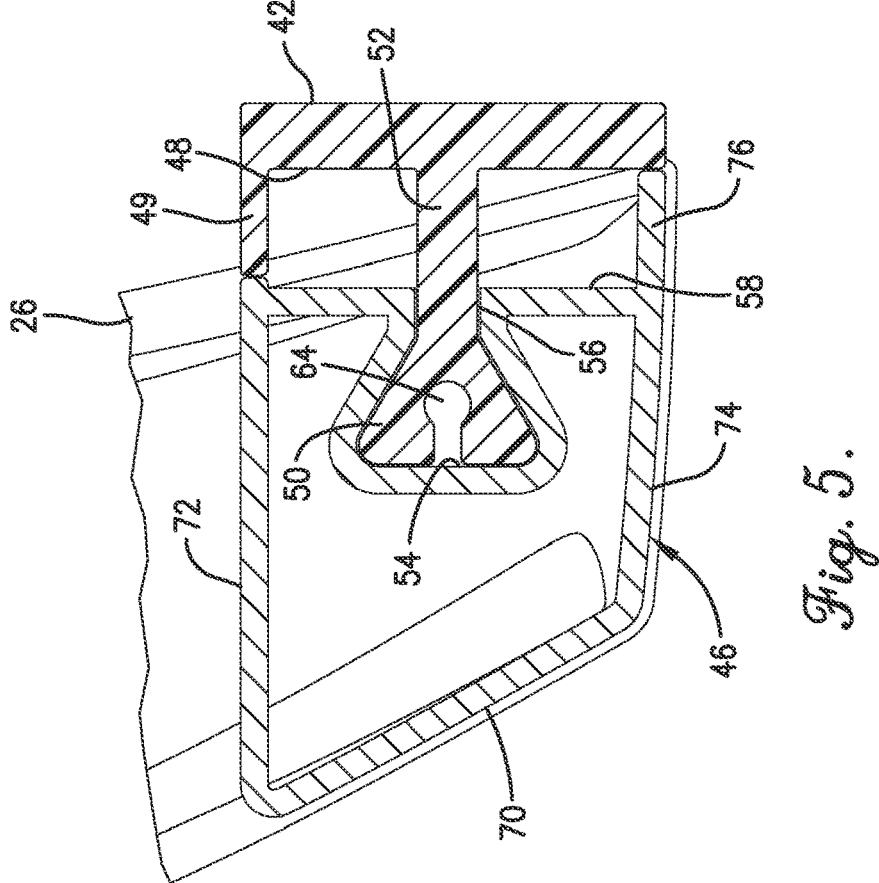
FIG. 5 is an end elevation view of the retractable awning taken in vertical section along line 5-5 in FIG. 2 in the direction of the arrows.

Turning additionally to FIGS. 5 and 6, in one embodiment, in order to then lock the head assemblies 26 in place on the slide bracket assemblies 40, the tenon 50 of the plate 42 may be expanded within the slot 54 to rigidly frictionally resist further sliding movement of the tenon 50 with the slot 54. A longitudinal slot or channel 64 may be formed in the tenon 50 to receive an oversized shaft 66 of a fastener such as a bolt 68. The shaft 66 may include self-tapping threads that allow the oversized shaft 66 to be turned into an end of the channel 64 and then progress a desired distance along the channel 64 to cause outward spreading of the tenon 50 on opposite sides of the channel 64. In the illustrated embodiment, the tenon 50 flares outwardly to form a triangular cross-sectional shape and the slot 54 has a complemental shape. When the tenon 50 is expanded by the bolt 68, two sides of the tenon 50 are forced against the two facing surfaces that define a portion of the slot 54. It is to be understood that other methods may be used to lock the head assemblies 26 in place on the slide bracket assemblies 40.

The mounting arms 46 each have a front side 70, a top 72, and a bottom 74 that are interconnected with the back side 58 of the mounting arm 46 and may be constructed as planar, solid surfaces to hide the slide bracket assemblies 40 to present a more visually pleasing appearance. To protect against rocking motion of the mounting arms 46 on the slide bracket assemblies 40, the flange 49 may extend outwardly from the main body 48 of the plate 42 to contact or be closely spaced from an upper rear portion of the mounting arm 46 and a similar flange 76 may extend inwardly from a lower rear portion of the mounting arm 46 to contact or be closely spaced from the plate 42.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

In the specification and claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claim, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Range limitations may be combined and/or interchanged. Such ranges are identified and include all the sub-ranges contained therein unless context or language indicates otherwise.

As used herein, the terms "axial" and "axially" refer to directions and orientations extending substantially parallel to a center longitudinal axis of the combustor. The terms "radial" and "radially" refer to directions and orientations extending substantially perpendicular to the central axis. Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

The terms "coupled," "fixed," "attached to," and the like refer to both direct coupling, fixing, or attaching, as well as indirect coupling, fixing, or attaching through one or more intermediate components or features, unless otherwise specified herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

What is claim is:

1. A retractable awning for mounting with a slide-out room on a recreational vehicle, said retractable awning comprising:
   a roller having opposite ends that are each supported by a head assembly;
   a canopy having a back end for attachment with the recreational vehicle and a front end attached to the roller, the roller being rotatable in one direction to cause said canopy to wind around the roller and being rotatable in an opposite direction to allow said canopy to unwind from the roller; and
   a slide bracket assembly associated with each of the head assemblies, each said slide bracket assembly comprising:
      a plate for mounting on a front side of the slide-out room and an elongated tenon extended outwardly from a main body of the plate; and
      an elongated mounting arm that extends from the head assembly at one of the ends of the roller and includes an end that faces in a direction toward the mounting arm at the opposite end of the roller and an elongated slot that slidably receives the tenon from the plate and is lockable with the tenon to prevent sliding movement of the tenon within the slot,
      wherein the tenon has a triangular cross-sectional shape and the elongated slot in the mounting arm has a complemental shape,
      wherein the tenon is spaced outwardly from a front face of the plate by a standoff extending perpendicularly from the plate.

2. The retractable awning of claim 1, wherein the tenon is expandable within the slot to prevent said sliding movement of the tenon within the slot.

3. The retractable awning of claim 2, wherein the tenon includes a longitudinal channel within which an oversized shaft of a fastener may be turned to cause outward spreading of the tenon to frictionally engage against surfaces defining the elongated slot in the mounting arm.

4. The retractable awning of claim 1, wherein the mounting arm includes a front side, a top, and a bottom that are interconnected and cover the slide bracket assembly.

5. The retractable awning of claim 1, wherein the elongated slot in each of the mounting arms extends through the end of the mounting arm that faces in the direction toward the mounting arm at the opposite end of the roller.

6. The retractable awning of claim 1, wherein in each of the slide bracket assemblies a fastener may be inserted in the tenon to lock an associated one of the head assemblies in place on the slide bracket assembly.

7. The retractable awning of claim 1, wherein the elongated slot opens through a neck opening in a back side of an associated one of the mounting arms to allow the mounting arm to slide along the plate with the tenon received within the slot.

8. A retractable awning for mounting with a slide-out room on a recreational vehicle, said retractable awning comprising:

a roller having opposite ends that are each supported by a head assembly;

a canopy having a back end for attachment with the recreational vehicle and a front end attached to the roller, the roller being rotatable in one direction to cause said canopy to wind around the roller and being rotatable in an opposite direction to allow said canopy to unwind from the roller;

a torsion spring carried on an internal rod within the roller that urges rotation of the roller to cause winding of the canopy on the roller; and a slide bracket assembly associated with each of the head assemblies, each said slide bracket assembly comprising:

a plate for mounting on a front side of the slide-out room and an elongated tenon extended outwardly from a main body of the plate, wherein the tenon is spaced outwardly from a front face of the plate by a standoff extending perpendicularly from the plate; and an elongated mounting arm that extends from the head assembly at one of the ends of the roller and includes an end that faces in a direction toward the mounting arm at the opposite end of the roller and an elongated slot that slidably receives the tenon from the plate and is lockable with the tenon to prevent sliding movement of the tenon within the slot, wherein the mounting arm includes a front side, a top, and a bottom that are interconnected and cover the slide bracket assembly.

9. The retractable awning of claim 8, wherein the tenon is expandable within the slot to prevent said sliding movement of the tenon within the slot.

10. The retractable awning of claim 8, wherein the tenon includes a longitudinal channel within which an oversized shaft of a fastener may be turned to cause outward spreading of the tenon to frictionally engage against surfaces defining the elongated slot in the mounting arm.

11. The retractable awning of claim 8, wherein the elongated slot opens through a neck opening in a back side of an associated one of the mounting arms to allow the mounting arm to slide along the plate with the tenon received within the slot.

12. The retractable awning of claim 8, wherein the tenon has a triangular cross-sectional shape and the elongated slot in the mounting arm has a complemental shape.

13. The retractable awning of claim 8, wherein the elongated slot in each of the mounting arms extends through the end of the mounting arm that faces in the direction toward the mounting arm at the opposite end of the roller.

14. The retractable awning of claim 8, wherein in each of the slide bracket assemblies a fastener may be inserted in the tenon to lock an associated one of the head assemblies in place on the slide bracket assembly.

15. A retractable awning for mounting with a slide-out room on a recreational vehicle, said retractable awning comprising:

a roller having opposite ends that are each supported by a head assembly;

a canopy having a back end for attachment with the recreational vehicle and a front end attached to the roller, the roller being rotatable in one direction to cause said canopy to wind around the roller and being rotatable in an opposite direction to allow said canopy to unwind from the roller; and a slide bracket assembly associated with each of the head assemblies head assembly, each said slide bracket assembly comprising:

a plate for mounting on a front side of the slide-out room and an elongated tenon extended outwardly from a main body of the plate; and an elongated mounting arm that extends from the head assembly at one of the ends of the roller and includes an end that faces in a direction toward the mounting arm at the opposite end of the roller and an elongated slot that slidably receives the tenon from the plate and is lockable with the tenon to prevent sliding movement of the tenon within the slot, wherein the tenon has a triangular cross-sectional shape and the elongated slot in the mounting arm has a complemental shape, wherein the tenon is spaced outwardly from a front face of the plate by a standoff extending perpendicularly from the plate, wherein the elongated slot in each of the mounting arms extends through the end of the mounting arm that faces in the direction toward the mounting arm at the opposite end of the roller, wherein the mounting arm includes a front side, a top, and a bottom that are interconnected and hide the slide bracket assembly.

16. The retractable awning of claim 15, wherein the elongated slot opens through a neck opening in a back side of an associated one of the mounting arms to allow the mounting arm to slide along the plate with the tenon received within the slot.

17. The retractable awning of claim 16, wherein the tenon includes a longitudinal channel within which an oversized shaft of a fastener may be turned to cause outward spreading of the tenon to frictionally engage against surfaces defining the elongated slot in the mounting arm.

18. The retractable awning of claim 16, wherein the tenon is expandable within the slot to prevent said sliding movement of the tenon within the slot.

19. The retractable awning of claim 16, including a flange extending outwardly from each of the plates to contact or be spaced from an associated one of the mounting arms.

20. The retractable awning of claim 19, including a flange extending inwardly from each of the mount arms to contact or be closely spaced from an associated one of the plates.

* * * * *